Figure 1:
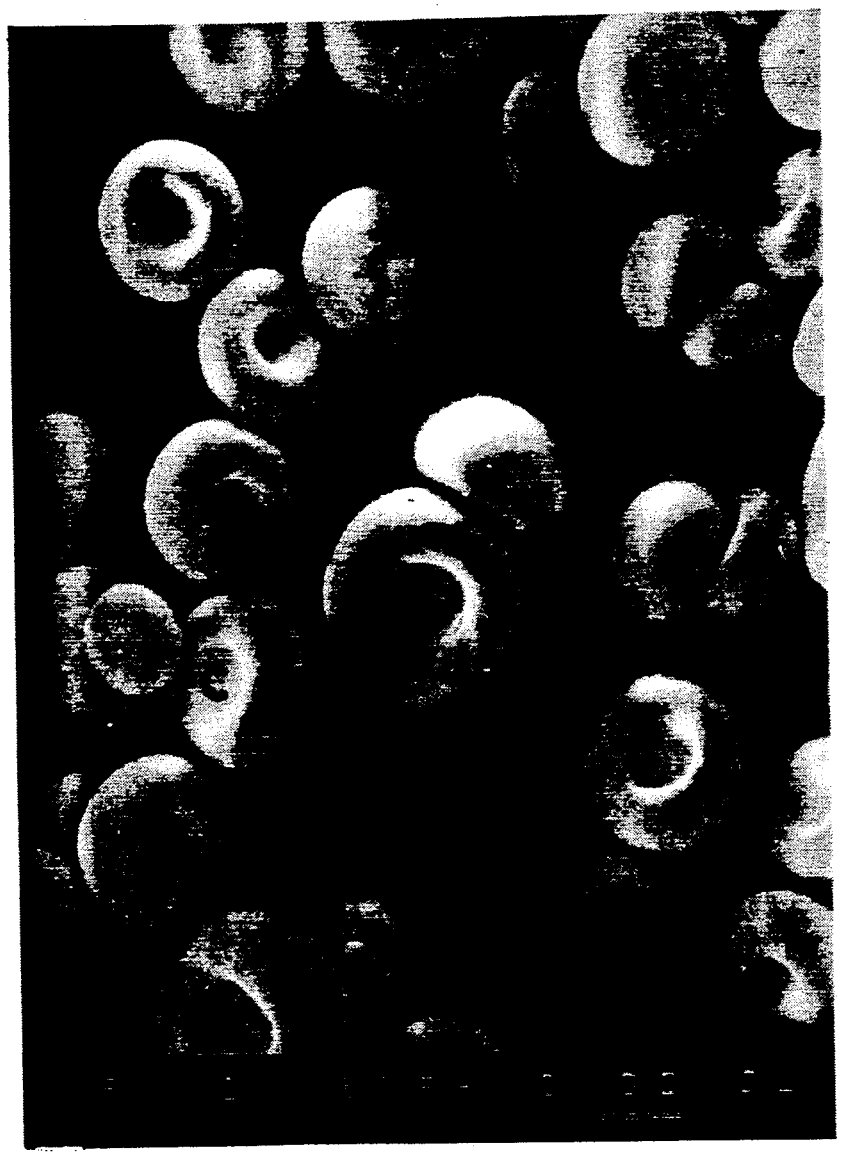

United States Patent
Rademachers et al.

[11] Patent Number: 5,108,508
[45] Date of Patent: Apr. 28, 1992

[54] RUTILE MIXED PHASE PIGMENT MICROGRANULATES, A PROCESS FOR THEIR PREPARATION AND THEIR USE

[75] Inventors: Jakob Rademachers; Hans-Ulrich Höfs; Dieter Räde, all of Krefeld, Fed. Rep. of Germany

[73] Assignee: Bayer Aktiengesellschaft

[21] Appl. No.: 580,086

[22] Filed: Sep. 10, 1990

[30] Foreign Application Priority Data

Sep. 21, 1989 [DE] Fed. Rep. of Germany ....... 3931417

[51] Int. Cl.$^5$ .................. C04B 14/30; C09C 1/36
[52] U.S. Cl. ..................... 106/437; 106/400; 106/401; 106/409; 106/441; 106/447; 106/442; 106/440; 106/439; 106/438; 106/490; 423/593; 423/610
[58] Field of Search ............... 106/400, 401, 409, 437, 106/441, 447, 490, 438, 439, 440, 442

[56] References Cited

U.S. PATENT DOCUMENTS 4,042,653  8/1977  Beyn ..................................... 264/12
4,948,772  8/1990  Hoshino et al. ..................... 427/152

OTHER PUBLICATIONS

K. Masters, "Spray Drying Handbook", 1985, pp. 26 (1st ed), 492–495, 320–323, John Wiley and Sons, N.Y., TP 363 M38.

Primary Examiner—William R. Dixon, Jr.
Assistant Examiner—S. Hertzog

[57] ABSTRACT

Novel rutile mixed phase pigment microgranulates are disclosed which comprise hemispherical particles indented to form toroid-shaped beads. The microgranulates are free-flowing, non-dust forming, and are stable in handling.

5 Claims, 1 Drawing Sheet

RUTILE MIXED PHASE PIGMENT MICROGRANULATES, A PROCESS FOR THEIR PREPARATION AND THEIR USE

This invention relates to rutile mixed phase pigments in the form of microgranulates, to their preparation and to their use.

Rutile mixed phase pigments are coloured pigments obtained by the incorporation of coloured transition elements into the crystal lattice of rutile. These metals are mainly built as guest components into the host lattice of the rutile and have cation radii of the same order of magnitude as the radius of the titanium-(IV) ion. If the valency of the cation to be incorporated differs from that of the titanium ion, which is 4, another cation of a different valency is added for statistical equalization of the valencies. Nickel and chromium rutile mixed phase pigments have achieved considerable importance in the industrial production of such pigments. In these processes, oxides of a higher valency, in particular oxides of antimony and, more rarely, oxides of niobium or tungsten, are incorporated to compensate for the valencies of the colour producing nickel and chromium oxides (Ullmanns Encyklopädie der techn. Chemie, publishers Chemie GmbHm Weinheim, 1979, 4th Edition, Volume 18, page 608).

The mixed phase pigments with a rutile lattice are produced by annealing homogeneous mixtures of titanium dioxide as host component and colour producing guest components at temperatures above 1000° C. Instead of using oxidic guest components, thermally unstable compounds of the metals of the guest component, such as their hydrates, hydroxides, hydrated oxides, carbonates, acetates, nitrates or formates may be mixed with titanium dioxide, titanium hydroxide or hydrated titanium dioxide, these unstable compounds being converted into the corresponding oxides of the guest components when heated in air.

After the stage of calcination, the pigment clinkers obtained are either ground in the wet state or reduced to the required degree of pigment fineness in the dry state. The finished pigments are put into use as very fine powders which can readily be dispersed in synthetic resins and other binder systems. The rutile mixed phase pigment powders hitherto used have the disadvantage that they tend to form dust, are liable to clump together in storage and are difficult to dose. In DE-A-3 132 303, it is proposed to overcome these disadvantages by producing granulates of rutile mixed phase pigments having diameters of from 100 to 600 $\mu$m by thermal roller granulation followed by sieving.

The disadvantage of this method is the large quantity, amounting to 1 to 15% by weight, of polyethers or polyethylene glycols with softening points from 35 to 80° C. required as granulating auxiliaries, which may deleteriously affect the pigments, depending on the purpose for which the latter are to be used.

It is generally known that microgranulates having diameters from 30 to 600 $\mu$m may be prepared by spray drying. This process normally gives rise to granules in the form of porous microspheres although hollow spheres are frequently also formed. The latter have the disadvantage that they cause the pigment to introduce air into the frequently highly viscous binder systems in the process of dispersion.

It is an object of the present invention to provide microgranulates which do not have the disadvantages described above. They are required to be stable when handled and to be readily dispersible in the various binders like pigment powders without introducing air bubbles.

This problem has been solved by providing rutile mixed phase pigment microgranulates consisting predominantly of hemispherical particles measuring from 30 to 600 $\mu$m which are drawn inwards on the flat side to produce a toroidal form. FIG. 1 shows the rutile mixed phase pigment microgranulates in 150 fold magnification.

Similar microgranulates have become known in the field of ceramic materials (K. Masters Spray Drying, L. Hill Books, London, 1972, page 26).

Similar microgranulates have not hitherto been described in the field of rutile mixed phase pigments. There is no general process for the controlled production of such granulates. On the contrary, suspensions of the granulates differ greatly in their behaviour under spray drying and the results obtained cannot be accurately predicted. Possible forms of granulates obtained are shown on pages 306 and 307 of K. Masters: Spray Drying, L. Hill Books, london 1972.

The microgranulates according to the invention are virtually dust free and sufficiently mechanically stable, they do not clump together and they can easily be dosed. Their distribution in a wide variety of binder systems is surprisingly found to be equal to that of the ungranulated pigment powders.

The microgranulates according to the invention preferably contain from 0.1 to 0.9% by weight of binder in the form of sodium or ammonium polyacrylate. It has been found that the addition of silicone oils improves the fluidity and dispersibility of the substances in synthetic resins. The silicone oils used are preferably polyorgano hydrogen siloxanes but organopolysiloxanes may also be used. The total quantity of silicone oils used is from 0 1 to 2.0% by weight, based on the pigment.

The rutile mixed phase pigment microgranulates according to the invention are prepared by spraying an aqueous pigment suspension containing from 0 1 to 0.9% by weight of binder in the form of sodium and/or ammonium polyacrylate and optionally from 0.1 to 2 0% by weight of silicone oil, based on the quantity of pigment, into a spray tower through a hollow conical nozzle at admission pressures of from 2 to 30 bar and then drying the product.

The aqueous suspension may advantageously be prepared from filter cakes obtained in the manufacture of the pigments, the binder and any other additives, such as silicone oil, being added with vigorous mixing, optionally with the addition of water. If the pigment is only available in the dry state, the suspension is prepared by the addition of water and binder to the ground pigment.

The pigment concentration in the suspension varies from 30 to 70% by weight, depending on the type of pigment and on the binder added. The suspension must be in a suitable consistency for pumping and injecting through a nozzle for the subsequent granulating process.

Spray granulating drying takes place in the spray tower. The pigment microgranulates according to the invention cannot be produced in a fluidized bed spray dryer as they are only obtained in the form of spherical agglomerates when such an apparatus is used. The suspension is sprayed through a hollow cone nozzle. This liquid pressure nozzle which produces a spray in the form of a hollow cone is suitable for the preparation of the microgranulates according to the invention. Other nozzles, e.g. two-material nozzles, give rise to other forms and particle size distributions of the microgranulates. Atomiser discs are also unsuitable.

The present invention relates also to the use of the rutile mixed phase pigment microgranulates according to the invention for colouring plastics, lacquers, building materials, enamel and ceramic glazes. It has been shown that both in dispersibility and in coloristic properties there is no difference between these microgranulates and corresponding pigment powders. Another advantage of the microgranulates according to the invention is that they do not introduce air when incorporated into the matrix since they are substantially free from closed cavities.

The process according to the invention is described with the aid of the Examples given below which, however, are not to be regarded as limiting the invention.

EXAMPLE 1

100 kg of ground rutile mixed phase pigment light yellow 6 R (trade product of Bayer AG), 70 kg of water and 0.8 kg of Dispex N 40 (trade product of Allied Colloids Manufacturing GmbH) corresponding to 0.32 kg of sodium polyacrylate are stirred together to form a homogeneous suspension which is conveyed by hose pump at the rate of 36 kg per hour into a cylindrical spray dryer 1.00 m in diameter and 5.20 m in height equipped with a liquid pressure nozzle of Gustav Schlick GmbH & Co. (Model 100, bore 1 1 mm, spray angle 30°). The liquid pressure in front of the nozzle is maintained at 3 bar. The temperatures of the combustion gases are 520° C. at the entrance into the dryer and 180° C. at its exit. The dried product obtained consists predominantly of hemispheres indented to form toroids and measuring from 200 to 400 $\mu$m. The product has good flow properties with outflow times from the 4 mm DIN cup of 70 seconds (DIN 53 211 of Apr. 1974). The dispersibility in synthetic resins determined by the number of hard spots in an LD-PE blown film having a pigment volume concentration of 1% and the colour data determined on extruded HD-PE platelets at a pigment volume concentration of 0.5% showed no difference to the results obtained on comparison samples which had been coloured with pigment powder.

EXAMPLE 2

Filter cake obtained from the production of light yellow 6 R (trade product of Bayer AG) containing chromium-antimony and having a solids content of 65% by weight is treated as in Example 1. The microgranulates obtained show no difference from the granulates obtained in Example 1.

EXAMPLE 3

0.8% by weight of the silicone oil Baysilone-Öl MH 15 (trade product of Bayer AG), based on the solids content, are added to the aqueous pigment suspension containing binder. The process is otherwise the same as in Example 1 except that the nozzle has a bore measuring 0.8 mm. The microgranulate obtained (FIG. 1) measuring from 100 to 250 $\mu$m has improved fluidity, amounting to an outflow time of 50 seconds from a 4 mm DIN cup. The other properties are unchanged.

COMPARISON EXAMPLE 1

The aqueous suspension containing binder obtained in Example 3 is conveyed to a spray dryer having a diameter of 2 90 m and a cylindrical height of 2.10 m and equipped with an atomiser disc operated at a speed of 16,400 revs. per min. When the suspension is passed through at the rate of 200 kg per hour, spherical microgranulates having diameters of from 50 to 200 $\mu$m are obtained. No toroidally indented hemispheres are observed.

COMPARISON EXAMPLE 2

180 kg of water are added to 100 kg of light yellow 6 R (trade product of Bayer AG) and the components are vigorously mixed. The viscous paste obtained is sprayed into the spray tower as in Example 1 at the rate of 18 kg per hour. The microgranulates obtained consist of well formed spheres with diameters from 50 to 250 $\mu$m. Here again, no toroidally indented hemispheres are obtained.

What is claimed is:

1. Rutile mixed phase pigment microgranulates which are free-flowing, non-dust forming and stable in handling, said microgranulates comprising hemispherical particles measuring from 30 to 600 $\mu$m which are indented on the flat side to form toroidal beads.

2. Rutile mixed phase pigment microgranulates as claimed in claim 1 containing from 0.1 to 0.9% by weight of a binder of sodium polyacrylate, ammonium polyacrylate, or mixtures thereof.

3. Rutile mixed phase pigment microgranulates as claimed in claim 1 containing from 0.1 to 2.0% by weight of one or more silicone oils.

4. Rutile mixed phase pigment microgranulates as claimed in claim 2 containing from 0.1 to 2.0% by weight of one or more silicone oils.

5. A process for the preparation of rutile mixed phase pigment microgranulates as claimed in claim 1 comprising providing an aqueous suspension of pigment which optionally contains from 0.1 to 0.9% by weight of binder and optionally contains from 0.1 to 2.0% by weight of silicone oil, based on the quantity of pigment, spraying said suspension into a spray tower through a hollow cone nozzle at admission pressures of from 2 to 30 bar, and drying the product.

* * * * *